United States Patent [19]
Sai

[11] Patent Number: 5,765,948
[45] Date of Patent: Jun. 16, 1998

[54] LIGHT-TEMPERATURE DISTRIBUTION SENSOR USING BACK SCATTERING LIGHT PRODUCED BY INCIDENT LIGHT PULSE AND TEMPERATURE DISTRIBUTION MEASURING METHOD

[75] Inventor: Yukio Sai, Tokorozawa, Japan

[73] Assignee: Kabushiki Kaisha Toshiba, Kawasaki, Japan

[21] Appl. No.: 606,797

[22] Filed: Feb. 26, 1996

[30] Foreign Application Priority Data

Mar. 7, 1995 [JP] Japan ................... 7-047551

[51] Int. Cl.$^6$ ........................................ G01K 11/32
[52] U.S. Cl. .................. 374/161; 374/137; 250/227.14
[58] Field of Search ........................ 374/130, 131, 374/137, 161; 250/227.14

[56] References Cited

U.S. PATENT DOCUMENTS

| | | | |
|---|---|---|---|
| 4,575,259 | 3/1986 | Bacci et al. ................... | 374/130 |
| 4,577,109 | 3/1986 | Hirschfeld ...................... | 250/461 |
| 4,655,608 | 4/1987 | Goss et al. ..................... | 374/119 |
| 4,714,829 | 12/1987 | Hartog et al. ................ | 250/227.14 |
| 4,767,219 | 8/1988 | Bibby ......................... | 374/131 X |
| 4,804,264 | 2/1989 | Kirchhofer et al. ......... | 374/161 X |
| 4,823,166 | 4/1989 | Hartog et al. ............... | 374/131 X |
| 5,096,277 | 3/1992 | Kleinerman ................... | 385/12 |
| 5,200,796 | 4/1993 | Lequime .................... | 374/161 X |
| 5,217,306 | 6/1993 | Wada ........................ | 374/161 |
| 5,272,334 | 12/1993 | Sai ............................ | 250/227.21 |
| 5,348,396 | 9/1994 | O'Rourke et al. ........... | 374/161 |
| 5,449,233 | 9/1995 | Sai et al. | |

FOREIGN PATENT DOCUMENTS

| | | | |
|---|---|---|---|
| 1-69925 | 3/1989 | Japan ........................ | 374/161 |
| 3-237313 | 10/1991 | Japan ..................... | 250/227.14 |

*Primary Examiner*—Ronald Biegel
*Assistant Examiner*—Paul D. Amrozowicz
*Attorney, Agent, or Firm*—Oblon, Spivak, McClelland, Maier & Neustadt, P.C.

[57] ABSTRACT

In a light-temperature distribution sensor, Raman scattering light is extracted from back scattering light produced by a light pulse supplied into an optical fiber, thereby calculating a temperature distribution. An intensity distribution signal of anti-Stokes Raman scattering light is extracted from the back scattering light. An intensity distribution signal of Stokes Raman scattering light is extracted from the back scattering light. An intensity distribution signal of Rayleigh scattering light is extracted from the back scattering light. The intensity distribution signal of the anti-Stokes Raman scattering light and the intensity distribution signal of the Stokes Raman scattering light are normalized, with the intensity distribution signal of the Rayleigh scattering light used as reference signal. A temperature distribution on the light transmission medium is calculated on the basis of the value of a product of the normalized intensity distribution signals of the anti-Stokes Raman scattering light and the Stokes Raman scattering light.

25 Claims, 4 Drawing Sheets

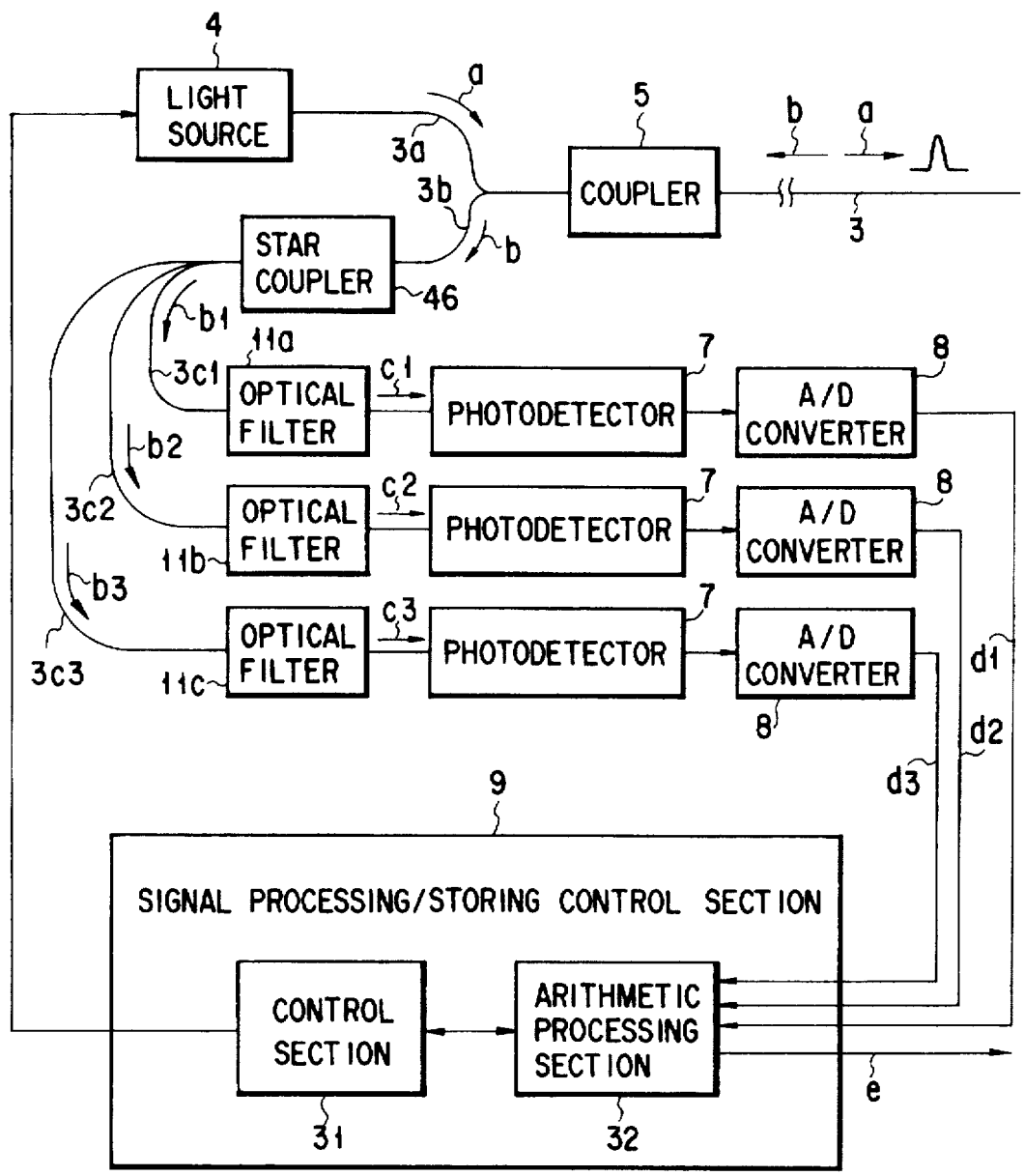
F I G. 12

LIGHT-TEMPERATURE DISTRIBUTION SENSOR USING BACK SCATTERING LIGHT PRODUCED BY INCIDENT LIGHT PULSE AND TEMPERATURE DISTRIBUTION MEASURING METHOD

BACKGROUND OF THE INVENTION

1. Field of the Invention

The present invention relates to a light-temperature distribution sensor and a temperature distribution measuring method for measuring back scattering light produced when a light pulse enters an optical fiber and thus measuring a temperature distribution.

2. Description of the Related Art

Raman scattering is a phenomenon in which light incident on a substance scatters with its wavelength displaced due to molecular vibration, lattice vibration, etc. The Raman scattering has widely been used in measuring the temperature of a substance.

Recently, a light-temperature distribution sensor has been developed, which measures Raman scattering light on the light pulse incidence side, thereby measuring a temperature distribution of an optical fiber and thus measuring the temperature of an object for measurement. This temperature measuring technique has been achieved by developments of laser oscillation technology, light measurement technology, etc. The temperature measurement is effected by making a laser pulse beam incident on an optical fiber and extracting Raman scattering light from the back scattering light of the pulse beam.

The Raman scattering light contains Stokes light with a wavelength with a longer wavelength than the incident light (hereinafter referred to as "excitation light") and anti-Stokes light with a shorter wavelength than the excitation light. In particular, the anti-Stokes light is more sensitive to the temperature of a substance than the Stokes light.

When temperature measurement is performed by applying a laser pulse to the optical fiber, it is necessary to take into consideration the attenuation of back scattering light due to the optical fiber. Thus, Stokes light having the same degree of deviation in wavelength from the excitation light is used in order to compensate the attenuation. Specifically, a component of attenuation effect commonly included in the anti-Stokes light and Stokes light is removed by a division calculation based on radar equations relating to both anti-Stokes light and Stokes light. Thereafter, a temperature distribution in the optical fiber is calculated.

The above light temperature distribution sensor comprises a light source, such as a semiconductor laser, for generating light pulses, a coupler for guiding an excitation beam to the optical fiber or guiding back scattering light to a photodetector, an optical filter, provided between the coupler and the photodetector, for switching filters for deriving scattering light of one of anti-Stokes light and Stokes light, and a signal processing unit.

At first, the optical filter is switched to the one for detecting anti-Stokes light. Then, a predetermined number of light pulses are emitted from the light source.

Then, the anti-Stokes light received by the photodetector via the optical filter is detected/added in synchronism with the emission of the light pulses in the signal processing unit, and an unnecessary noise component is removed. Thus, an intensity distribution signal relating to the anti-Stokes light is obtained. The intensity distribution signal is converted from the intensity distribution associated with time to the intensity distribution associated with positions on the optical fiber.

Similarly, the optical filter is switched to the one for detecting Stokes light and the Stokes light is detected/added. Thus, an intensity distribution signal relating to the Stokes light is obtained.

In the signal processing unit, as mentioned above, a component of attenuation effect commonly included in the anti-Stokes light and Stokes light is removed by a division calculation based on radar equations relating to both anti-Stokes light and Stokes light. Thus, a temperature distribution associated with positions on the optical fiber is calculated.

In the meantime, as mentioned above, it is necessary to eliminate the attenuation effect of the optical fiber from each signal. Specifically, the attenuation effect is eliminated by using radar equations relating to anti-Stokes light and Stokes light.

At first, an intensity distribution signal I of light intensity obtained via the photodetector, a scattering coefficient k at position x on the optical fiber and an attenuation factor $\alpha$ of the optical fiber are expressed by radar equation (1):

$$d\ln I/dx - d\ln k(x)/dx = -\alpha_f - \alpha_b \qquad (1)$$

where $\alpha_f$: an attenuation factor in energizing light pulses when they travel for a short distance at position x; and $\alpha_b$: an attenuation factor in scattering light when it travels backward for a short distance from position x.

Since the wavelength of the energizing light pulses differs from that of the back scattering light, the value of attenuation factor $\alpha_f$ differs greatly from that of attenuation factor $\alpha_b$.

In general, the attenuation factor $\alpha$ is determined by the structure and material of an optical fiber and the condition of a primary cladding of the optical fiber. In addition, however, the value of the attenuation factor $\alpha$ depends greatly on the physical condition, e.g. a stress acting in an optical fiber core.

A protective metallic pipe is provided on the outside of the optical fiber body. The metallic pipe physically protects the delicate optical fiber, prevents oxidation of the optical fiber by filling a gas inside, and prevents water from coming in.

Normally, the optical fiber is formed of quartz with a lower thermal expansion coefficient than the metallic material. Thus, the length of the optical fiber is set to be greater than that of the metallic pipe so that a high stress does not act in the quartz due to expansion of the metallic pipe at high temperatures.

Accordingly, the optical fiber core extends in the metallic pipe in a meandering manner, and a micro-bending loss or a bending loss occurs. If the optical fiber with the metallic pipe sheath is placed on an object for temperature measurement, a thermal stress according to a temperature distribution is applied to the metallic pipe and the loss behavior of attenuation factor $\alpha$ in the internal optical fiber core becomes very complex.

In addition, the loss characteristics of the optical fiber, e.g. attenuation factor $\alpha$, varies delicately with the passing of time and sometimes a hysteretic or irreversible change occurs in characteristics.

In the prior art, in order to compensate the loss characteristics, both anti-Stokes light and Stokes light are measured and a temperature distribution is obtained from a signal ratio therebetween.

Specific radar equations of anti-Stokes light and Stokes light are as follows:

$$d\ln I_a/dx - d\ln k_a(x)/dx = -\alpha_f - \alpha_{ab} \quad (2)$$

$$d\ln I_s/dx - d\ln k_s(x)/dx = -\alpha_f - \alpha_{sb} \quad (3)$$

where $I_a$: anti-Stokes back scattering light at position x, $I_s$: Stokes back scattering light at position x, $k_a(x)$: anti-Stokes scattering coefficient at position x, $k_s(x)$: stokes scattering coefficient at position x, $\alpha_{ab}$: an attenuation factor in anti-Stokes scattering light when it travels backward for a short distance from position x, and $\alpha_{sb}$: an attenuation factor in Stokes scattering light when it travels backward for a short distance from position x.

From equations (2) and (3), a radar equation relating to a ratio R between anti-Stokes light and Stokes light can be derived:

$$d\ln R'/dx - d\ln R(x)/dx = -(\alpha_{ab} - \alpha_{sb}) \quad (4)$$

where

R': ratio ($I_s/I_a$) of measured signals, and

R(x): radio ($k_a(x)/k_s(x)$) of scattering coefficients at position x.

In the prior art, a temperature distribution in the optical fiber is calculated on the basis of equation (4).

However, the scattering attenuation factor α of the optical fiber is proportional to 1/(the wavelength to the fourth power). Thus, there is a considerable difference between the attenuation factor $\alpha_{ab}$ of anti-Stokes scattering light and the attenuation factor $\alpha_{sb}$ of Stokes scattering light. As a result, the attenuation effect of the optical fiber cannot completely eliminated from the temperature distribution arithmetic operation by the division calculation between them expressed in equation (4).

In addition, in general, the right side of equation (4) represents a function of temperature. Moreover, as mentioned above, in the case where an optical fiber core is inserted into a sheath such as a metallic pipe, the value of the right side of equation (4) varies greatly due to temperature hysteresis, bending, etc. of the metallic pipe.

In the conventional method, the temperature distribution of the optical fiber, and accordingly the temperature distribution of the object for temperature measurement, are calculated on the basis of only the measurement data obtained at the time of calibrating the light-temperature distribution sensor, adequate measurement precision cannot be maintained because of time-basis variation in attenuation factors $\alpha_{ab}$ and $\alpha_{sb}$ due to subsequently occurring temperature hysteresis, bending, etc. of the metallic pipe.

SUMMARY OF THE INVENTION

The object of the present invention is to provide a light-temperature distribution sensor and a temperature distribution measurement method capable of preventing degradation in precision of temperature distribution measurement due to a variation in characteristics of an attenuation factor of an optical fiber.

According to an aspect of the present invention, there is provided a light-temperature distribution sensor comprising:

a light transmission medium;

light incidence means for making a light pulse travel through the light transmission medium;

scattering light extraction means for extracting, from back scattering light produced by the light pulse in the light transmission medium, Rayleigh scattering light, anti-Stokes Raman scattering light and Stokes Raman scattering light as intensity distribution signals; and normalizing arithmetic processing means for normalizing the intensity distribution signal of the anti-Stokes Raman scattering light and the intensity distribution signal of the Stokes Raman scattering light, with the intensity distribution signal of the Rayleigh scattering light used as reference signal to obtain normalized intensity distribution signals, and calculating a temperature distribution on the light transmission medium on the basis of the normalized intensity distribution signals of the anti-Stokes Raman scattering light and the Stokes Raman scattering light.

As will be described in the description of the embodiments, if the temperature distribution is calculated on the basis of the values of the intensity distribution signals of the anti-Stokes and Stokes Raman scattering light, information on a variation in light intensity attenuation factor of the light transmission medium with the passing of time can be eliminated from the intensity distribution signal of each Raman scattering light. Thus, it is possible to prevent degradation in precision of temperature distribution measurement due to a variation in characteristics of an attenuation factor of an optical fiber.

According to another aspect of the invention, there is provided a light-temperature distribution sensor comprising:

a light transmission medium;

light incidence means for making a light pulse travel through the light transmission medium;

scattering light extraction means for extracting, from back scattering light produced by the light pulse in the light transmission medium, Rayleigh scattering light, anti-Stokes Raman scattering light and Stokes Raman scattering light as intensity distribution signals; and normalizing arithmetic processing means for normalizing the intensity distribution signal of the anti-Stokes Raman scattering light and the intensity distribution signal of the Stokes Raman scattering light, with the intensity distribution signal of the Rayleigh scattering light used as reference signal, and calculating a temperature distribution on the light transmission medium on the basis of the value of a product of the normalized intensity distribution signals of the anti-Stokes Raman scattering light and the Stokes Raman scattering light.

According to still another aspect of the invention, there is provided a method of measuring a light-temperature distribution, comprising the steps of:

making a light pulse travel through a light transmission medium which transmits incident light while attenuating the intensity of the light; extracting, from back scattering light produced by the light pulse in the light transmission medium, Rayleigh scattering light, anti-Stokes Raman scattering light and Stokes Raman scattering light as intensity distribution signals;

normalizing the intensity distribution signal of the anti-Stokes Raman scattering light and the intensity distribution signal of the Stokes Raman scattering light, with the intensity distribution signal of the Rayleigh scattering light used as reference signal to obtain normalized intensity distribution signals; and calculating a temperature distribution on the light transmission medium on the basis of the normalized intensity distribution signals of the anti-Stokes Raman scattering light and the Stokes Raman scattering light.

Thereby, as mentioned above, information on a variation in light intensity attenuation factor of the light transmission medium with the passing of time can be eliminated from the intensity distribution signal of each Raman scattering light. Thus, it is possible to prevent degradation in precision of temperature distribution measurement due to a variation in characteristics of an attenuation factor of a light transmission medium such as an optical fiber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 12 is a block diagram showing the structure of a light-temperature distribution sensor unit according to a fifth embodiment of the invention.

DETAILED DESCRIPTION OF THE PREFERRED EMBODIMENTS

Figure 1:
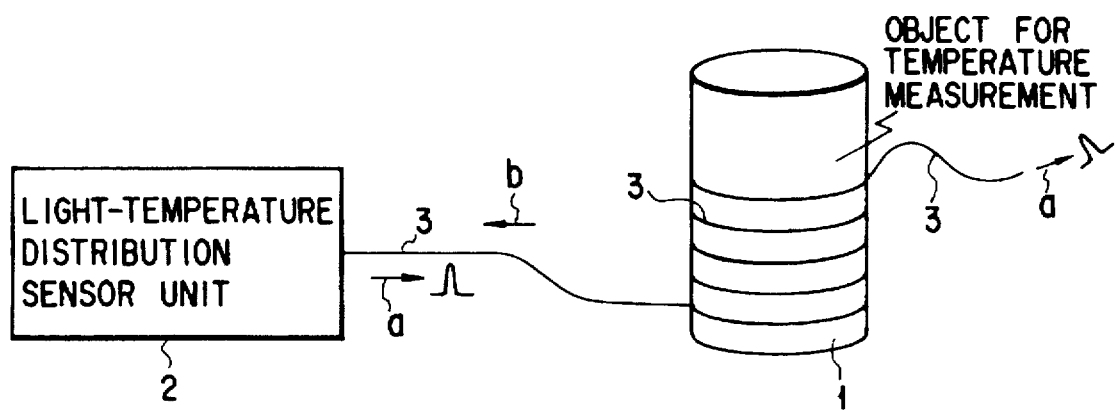
FIG. 1 shows an example of the entire structure of a light-temperature distribution sensor according to a first embodiment of the present invention.

Embodiments of the present invention will now be described.

(First Embodiment)

At first, a method of calculating a temperature distribution according to the present invention will be described.

In this method, radar equations used in a temperature distribution calculation process relate not only to the ratio between anti-Stokes light and Stokes light but also to Rayleigh scattering light.

A radar equation relating to Rayleigh scattering light is:

$$d \ln I_R/dx - d \ln k_R(x)/dx = -\alpha_f - \alpha_{Rb} \tag{5}$$

where $I_R$: Rayleigh scattering light at position x measured on the receiving side, $k_R(x)$: Rayleigh scattering coefficient, and $\alpha_{Rb}$: an attenuation factor in scattering light when it travels backward for a short distance from position x.

Rayleigh scattering light has the same wavelength as excitation light. Anti-Stokes light and Stokes light shift in wavelength by the same degree to the short wavelength side and long wavelength side with respect to the excitation light. Thus, equation (6) is obtained:

$$2\lambda_R = \lambda_a + \lambda_b \tag{6}$$

where $\lambda_R$: wavelength of Rayleigh scattering light, $\lambda_a$: wavelength of anti-Stokes Raman scattering light, $\lambda_b$: wavelength of Stokes Raman scattering light The reason why a time-basis variation occurs in a difference in attenuation factor in equation (4) is that each of attenuation factors $\alpha_{ab}$, $\alpha_{sb}$ and $\alpha_{Rb}$ has wavelength dependency. In addition, each attenuation factor varies due to microbend, bending loss, heat hysteresis, etc., while the wavelength dependency is retained.

On the other hand, a laser beam used in measurement is a near-infrared light beam with a wavelength of 800 to 1500 nm. A wavelength shift $\Delta v$ of Raman scattering light is several-ten nm which is about several % of the wavelength of its excitation light. Accordingly, the wavelength dependency of the attenuation factor can be linearly approximated with wavelength $\lambda_R$ of Rayleigh scattering light as a center for approximation. Thus, equation (7) is obtained:

$$2\alpha_{Rb} \approx \alpha_{ab} + \alpha_{sb} \tag{7}$$

If the signal ratio is calculated with reference to a Rayleigh scattering signal, equation (8) is obtained from equations (2) and (5) or equations (3) and (5):

$$d \ln R_a'/dx - d \ln R_a(x)/dx = -(\alpha_{ab} - \alpha_{Rb}) \tag{8}$$

$$d \ln R_s'/dx - d \ln R_s(x)/dx = -(\alpha_{sb} - \alpha_{Rb}) \tag{9}$$

where $R_a'$: a ratio of an anti-Stokes measurement signal to a Rayleigh measurement signal, $(I_a/I_R)$, $R_a(x)$: a ratio in scattering efficient at position x, $(k_a(X)/k_R(x))$, $R_s'$: a ratio of a Stokes measurement signal to a Rayleigh measurement signal, $(I_s/I_R)$, and $R_s(x)$: a ratio in scattering efficient at position x, $(k_s(x)/k_R(x))$.

By summing equations (8) and (9), radar equation (10) is obtained:

$$dln\ (R_s'\cdot R_a'/dx - dln\ (R_s(x)\cdot R_a(x))/dx = -(\alpha_{sb} + \alpha_{ab}) + 2\alpha_{Rb} \quad (10)$$

From equation (7), the right side of equation (10) is "0". Accordingly, the term of the attenuation factor of the optical fiber can be removed from the radar equation.

If equations (7) and (10) are solved, equation (11) can be obtained:

$$R_s(x)\cdot R_a(x) = (I_s/I_R)\cdot(I_a/I_R) \quad (11)$$

In equation (11), $R_s(x)\cdot R_a(x)$ is a function with only temperature and position used as parameters, and $I_a$, $I_s$ and $I_R$ are intensity distribution signals at respective positions obtained by measurement.

Accordingly, by using an object with a known temperature, calibration is performed in advance in connection with temperatures associated with $I_a$, $I_s$ and $I_R$. Specifically, a conversion table for conversion between known temperature information and corresponding intensity distribution signals is prepared. If this conversion table is used, a temperature distribution on the optical fiber can be calculated only by actually measuring intensity distribution signals $I_a$, $I_s$ and $I_R$.

In equation (11), since the term of attenuation factor of the optical fiber is removed, an exact temperature distribution can be calculated, irrespective of a subsequent variation in attenuation factor of the optical fiber.

It will now be proved that the value of $R_s(x)\cdot R_a(x)$ is exactly the function of temperature and position alone.

With respect to wavelength shift Δv of Raman scattering and temperature T of the substance which causes Raman scattering, the following equations (12) and (13) are established:

$$I_s \infty f(\Delta v, T) \quad (12)$$

$$I_a \infty f(\Delta v, T) \quad (13)$$

In these equations, $$f(\Delta v, T) = 1/\{\exp(hC\Delta v/kT) - 1\} \quad (14)$$

where h: Planck's constant,

C: Velocity of light, and

K: Boltzmann's constant

The wavelength shift Δv is a value determined by material (the optical fiber in this case). The intensity distribution signal $I_R$ of Rayleigh back scattering light does not depend on temperatures and the optical fiber is substantially uniform. Accordingly, this value can be considered to be constant.

From equations (11), (12) and (13), the following equation is obtained:

$$R_s(x)\cdot R_a(x) = f(\Delta v, T)\{1 + f(\Delta v, T)\} \quad (15)$$

It has thus been proved that $R_s(x)\cdot R_a(x)$ is the function of only temperature T and position x on the optical fiber.

The actual temperature calculation is performed on the basis of equation (11) and calibrated conversion data, as mentioned above. However, if $R_s(x)\cdot R_a(x)$ is deleted from equations (11) and (15), the temperature T is theoretically found by measurement of intensity distribution signals $I_a$, $I_s$ and $I_R$. Accordingly, $R_s(x)\cdot R_a(x)$ may be deleted by substituting equations (11) and (15), and the temperature distribution may be calculated by using a value obtained by multiplying the right side of equation (11) or the result of calculation of equation (11) by a correction coefficient.

An example of the structure of a light-temperature distribution sensor to which the above temperature distribution measuring method is applied will now be described.

FIG. 1 shows an example of the whole structure of a light-temperature distribution sensor to which the above-described temperature distribution measuring method according to the embodiment of the invention is applied.

Figure 2:
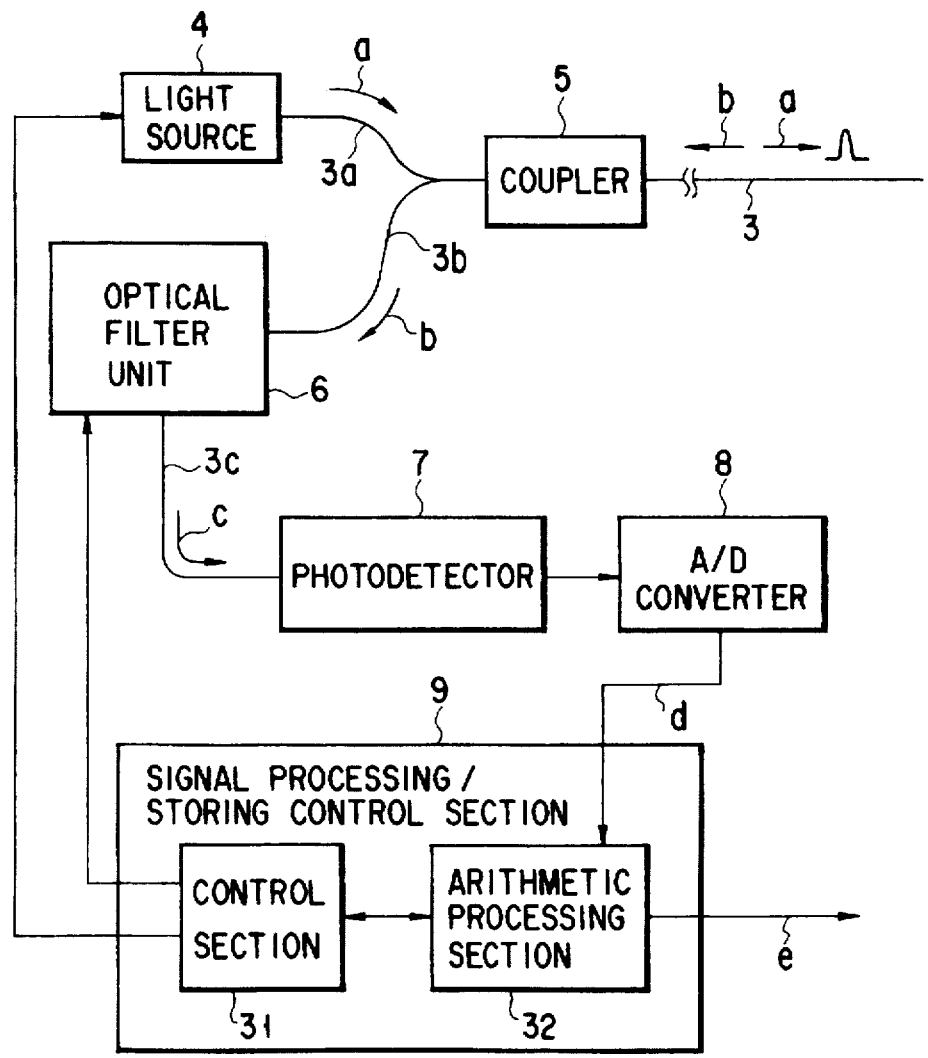
FIG. 2 is a block diagram showing the structure of a light-temperature distribution sensor unit in the first embodiment.

FIG. 2 is a block diagram showing an example of the internal structure of a light-temperature distribution sensor unit of the same embodiment.

In FIG. 1, an optical fiber 3 extending from a light-temperature distribution sensor unit 2 is wound around an object 1 for temperature measurement (hereinafter referred to as "object 1"). The length of the optical fiber 3 is about 1 to 2 km.

A light pulse a emitted from the sensor unit 2 travels through the optical fiber 3 and goes out from the side opposite to the sensor unit 2. At this time, back scattering light b due to Raman scattering, Rayleigh scattering, etc. in the optical fiber returns to the sensor unit 1. The back scattering light b is measured to determine the temperature of the object 1.

FIG. 2 is a block diagram showing the structure of the light-temperature distribution sensor unit 2.

As shown in FIG. 2, in the sensor unit 2, a light source 4 and a coupler 5 are connected by an optical fiber 3a. The aforementioned optical fiber 3 extends from the coupler 5 to the object 1.

In addition, in the sensor unit 2, the coupler 5 and an optical filter unit 6 are connected by a fiber 3b, and the optical filter unit 6 and a photo-detector 7 are connected by an optical fiber 3c. An output from the photodetector 7 is delivered to a signal processing/storing control section 9 via an A/D converter 8.

The light source 4 is constituted by, for example, a semiconductor laser and successively outputs light pulses a to the optical fibers 3a and 3. The pulse width of each light pulse a is about 10 to 20 nsec. The light source 4 oscillates at a constant frequency of about 1 to 10 kHz to produce the light pulses a.

The signal processing/storing control section 9 controls the supply/stop of pulses, the oscillation frequency of pulses, etc. About 10,000 to 1 million light pulses are emitted from the light source 4 by a single oscillation (in the following description, it is supposed that 100,000 light pulses are emitted by a single oscillation, and the 100,000 light pulses emitted by the single oscillation will be referred to as "light pulse train").

The coupler 5 guides each light pulse a from the light source 5 to the optical fiber 3 and guides back-scattering light b inside the optical fiber 3 to the optical fiber 3b.

The optical filter unit 6 selects light of specific wavelength from the back scattering light b and guides selected light c with specific wavelength to the photodetector 7.

Figure 3:
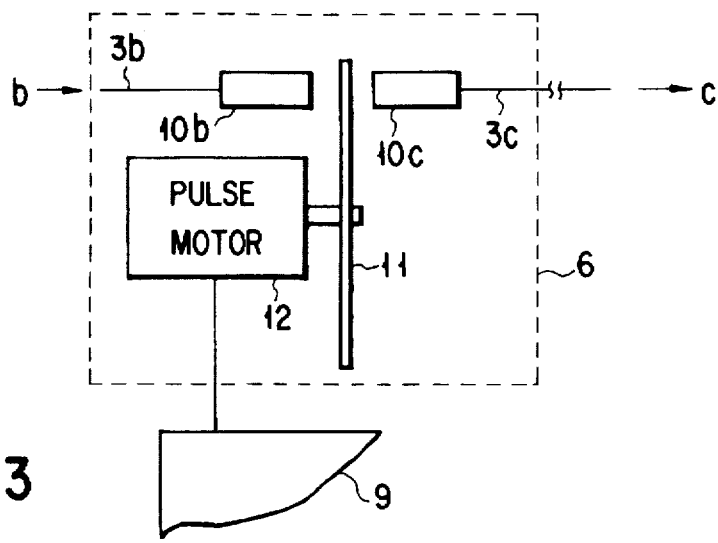
FIG. 3 shows the structure of an optical filter unit in the light-temperature distribution sensor unit.

FIG. 3 shows the structure of the optical filter unit 6.

As is shown in FIG. 3, those end portions of the optical fibers 3b and 3c, which are connected to the optical filter unit 6, are provided with lenses 10b and 10c. The lenses 10b and 10c face each other with an optical filter 11 interposed.

Figure 4A:
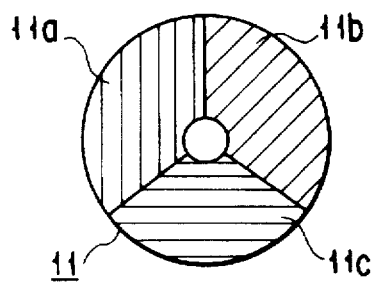
FIG. 4A is a front view showing the structures of optical filters of the optical filter units.
Figure 4B:
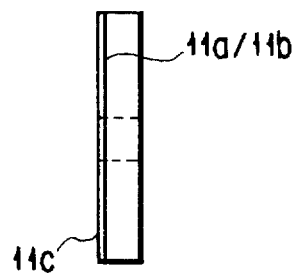
FIG. 4B is a side view showing the structures of optical filters of the optical filter units.

As is shown in FIGS. 4A and 4B, the optical filter 11 has a disk-like shape and comprises three filters: an anti-Stokes Raman scattering light pass filter 11a which passes only anti-Stokes wavelength light, a Stokes Raman scattering light pass filter 11b which passes only Stokes wavelength light, and a Rayleigh scattering light pass filter 11c which passes only Rayleigh wavelength light. Each of these pass filters has a fan shape.

The optical filter 11 is situated between lenses 10b and 10c such that the optical axis passes through any one of the pass filters 11a to 11c. A rotary shaft of a pulse motor is attached to the center of the disk-shaped filter 11.

The signal processing/storing control section 9 controls the rotation of the pulse motor 12, thereby switching the pass filters 11a to 11c of the optical filter 11 so that one of them coincides with the optical axis. Thus, only that light component of the light emitted from the lens 10b, which has a desired wavelength, passes through the optical filter 11. The passed light is guided as specific wavelength light c to the optical fiber 3c via the lens 10c.

The photodetector 7 converts the light guided from the optical fiber 3c to an electric signal.

The A/D converter 8 samples at high speed an output signal from the photodetector 7, converts the sampled signal to a digital signal d, and delivers the digital signal d to the signal processing/storing control section 9.

The signal processing/storing control section 9 comprises a control section 31 and an arithmetic processing section 32.

The control section 31 controls the light pulse emission from the light source 4 and the switching of the pass filters 11a to 11c of the optical filter 11 in the optical filter unit 6.

As will be described later, the arithmetic processing section 32 controls the filter unit and a series of measuring operations from the light pulse emission and calculates the temperature distribution on the optical fiber 3.

Figure 5:
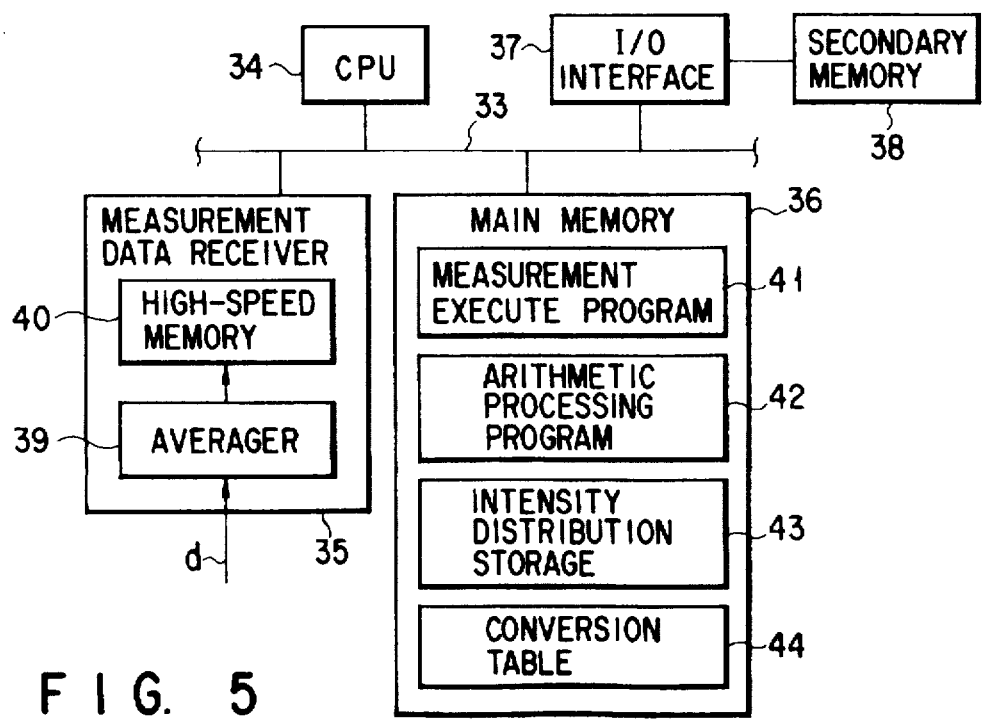
FIG. 5 is a block diagram showing the structure of an arithmetic operation unit in the light-temperature distribution sensor unit.

FIG. 5 is a block diagram showing the structure of the arithmetic processing section 32 in the light-temperature sensor.

As is shown in FIG. 5, the arithmetic processing section 32 comprises a CPU 34 connected to a bus 33, a measurement data receiver 35, a main memory 36, a secondary memory 38 connected to the bus 33 via an I/O interface 37, and peripheral elements (not shown).

The measurement data receiver 35 includes an averager 39 and a high-speed memory 40.

The averager 39 receives the digital signal d from the A/D converter 8 and delivers it to the high-speed memory 40. As has been described above, the light source emits a light pulse train of 100,000 pulses. The pulse width of each light pulse a is constant and also the pulse interval of light pulses a is constant. The averager 39 superposes the sampled digital signal d of each light pulse a on the high-speed memory 40, thereby adding and averaging the measurement data. Thus, an added/averaged intensity distribution signal is obtained in the high-speed memory 40.

The CPU 34 carries out a measurement execute operation and a temperature arithmetic-processing operation in accordance with each program in the main memory 36. Hereinafter, substantially cooperative operations among the CPU 34, the programs in the main memory 36 and other peripheral units will be described in such expressions as " program performs..." or "... is performed by  program."

The main memory 36 stores a measurement execute program 41, an arithmetic processing program 42, an intensity distribution storage 43 and a conversion table 44.

The measurement execute program 41 issues a command to the control section 31 to carry out a series of control operations, e.g. control of the light source 4 and switching of the optical filter 11, and performs measurement of each intensity distribution signal of anti-Stokes wavelength light, Stokes wavelength light and Rayleigh wavelength light included in the back scattering light b.

The measurement execute program 41 copies the measured intensity distribution signal from the high-speed memory 40 to the intensity distribution storage 43 within the main memory 36. After the measurement/copying of each intensity distribution signal has been completed, control is shifted to the arithmetic processing program 42. Subsequently, the temperature arithmetic processing operation is executed by the arithmetic processing program 42.

The arithmetic processing program 42 enables the CPU 34 to calculate the temperature distribution on the optical fiber 3 on the basis of the measured intensity distribution. Specifically, the intensity distribution signals associated with the anti-Stokes wavelength light, Stokes wavelength light and Rayleigh wavelength light, which are stored in the intensity distribution storage 43, are substituted in equation (11), thus finding the value of product $R_s(x) \cdot R_a(x)$ of the ratio of the scattering coefficient.

The arithmetic processing program 42 converts the result of the arithmetic processing to temperature on the basis of the conversion table 44, and calculates the temperature distribution at locations on the optical fiber 3. Furthermore, the calculated temperature distribution is output as a temperature distribution measurement result e.

The conversion table 44 stores conversion data by which a specific temperature is determined in accordance with the value of product $R_s(x) \cdot R_a(x)$ of the ratio of the scattering coefficient at a certain location. The conversion data is obtained by calibration measurement of the light-temperature distribution sensor. Specifically, in the temperature calibration measurement of the light-temperature distribution sensor, the measurement is performed with respect to a known temperature object. The known temperature corresponding to the value of $R_s(x) \cdot R_a(x)$ obtained by the measurement data is used as the conversion data.

The secondary memory 38 stores the calculated temperature distribution on the optical fiber 3, other programs, and other various data. The secondary memory 38 is, for example, a storage medium such as a hard disk or a photo-magnetic disk. In the present embodiment, a flash memory is used in consideration of use in bad condition.

A temperature distribution measurement method in the light-temperature distribution sensor of the present embodiment, which has the above structure, will now be described.

The measurement execute program 41 within the signal processing/storing control section 9 issues a command to the control section 31 to carry out a series of control operations for temperature measurement.

At first, an operation for obtaining an intensity distribution signal $I_a$ of anti-Stokes Raman scattering light is performed. Specifically, the control section 31 controls the pulse motor 12 and the anti-Stokes Raman scattering light pass filter 11a of the optical filter 11 is fixed so that the optical axis passes through the pass filter 11a.

Subsequently, about 100,000 light pulses are emitted from the light source 4 at a constant frequency of about 1 to 10 kHz under the control by the control section 31.

The emitted light pulses a pass through the optical fiber 3 while attenuating. Thereby, the light pulses a generate in the optical fiber 3 back scattering light b corresponding to the degree of attenuation at each location along the optical fiber 3 and corresponding to the peripheral temperature, i.e. the temperature of the optical fiber 3. The back scattering light b travels through the optical fiber 3 in a direction opposite to the incidence direction and returns to the light-temperature distribution sensor body 2.

Only anti-Stokes Raman scattering light is derived as specific wavelength light c from the back scattering light b, which has reached the light-temperature distribution sensor body 2, via the coupler 5 and the pass filter 11a of the optical filter unit 6. The specific wavelength light c is converted to a weak analog electric signal by the photodetector 7.

The analog electric signal derived from one light pulse a and corresponding to the anti-Stokes Raman scattering light is sampled at high speed and A/D converted by the A/D converter 8 and input as digital signal d to the averager 39 within the signal processing/storing control section 9. The averager 39 inputs the digital signal d to the high-speed memory 40.

Through the same process, the anti-Stokes Raman scattering light corresponding to the subsequent light pulse a are successively sampled and input to the averager 39. The averager 39 superimposes and adds the input signals so that the input signals correspond to temporal positions of the respective light pulses a. Thus, these input signals are averaged. In other words, signal components of the light pulses a, which have the same temporal positions on the optical fiber 3, are superimposed and added by the averager 39.

Thereby, noise components are canceled and the S/N of the back scattering light b, which inherently includes a large ratio of noise, is improved. Specifically, a noise component such as random noise is eliminated, and the precision of signals is enhanced.

Figure 6:
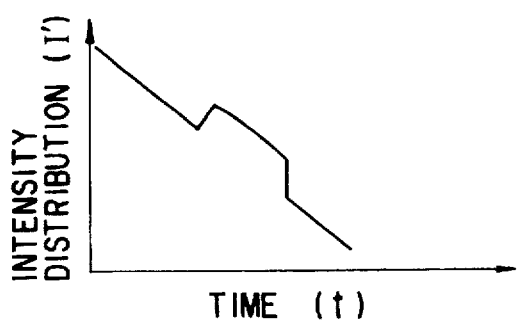
FIG. 6 is an example of an intensity distribution signal in the case where time is used as parameter.
Figure 7:
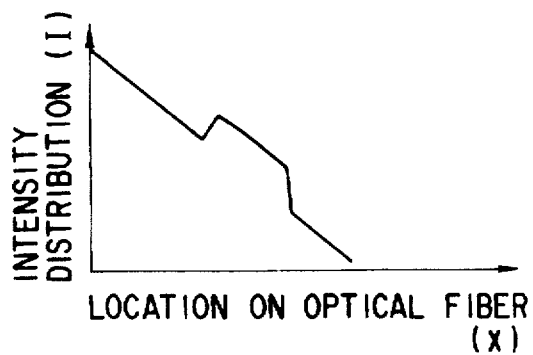
FIG. 7 is an example of an intensity distribution signal in the case where the position of an optical fiber is used as parameter.

FIG. 6 shows the intensity distribution I' of the thus obtained signal, which is determined on the basis of the passing of time, that is, which is a time series signal. The abscissa in FIG. 6, which represents time, corresponds to the location (x) on the optical fiber 3. Thus, the intensity distribution I' is associated, in a one-to-one corresponding manner, with the intensity distribution I obtained in relation to the location on the optical fiber, as shown in FIG. 7. Hereinafter, unless otherwise mentioned, the intensity distribution I' based on time is treated as intensity distribution I based on the location on the optical fiber.

The measurement execute program 41 copies the intensity distribution signal $I_a$ of the anti-Stokes Raman scattering light, which is measured and stored in the high-speed memory 40, into the intensity distribution storage 43 within the main memory 36.

Then, the filter on the optical axis is switched to the Stokes Raman scattering light pass filter 11b by the measurement execute program 41 of the signal processing/storing control section 9. The measurement execute program 41 also effects emission of the next light pulse train. Thereby, the measurement, addition/averaging, etc. are performed, and the intensity distribution signal $I_s$ of Stokes Raman scattering light is obtained, as in the case of the anti-Stokes Raman scattering light measurement. The intensity distribution signal $I_s$ within the high-speed memory 40 is stored in the intensity distribution storage 43 by the measurement execute program 41.

Then, the filter on the optical axis is switched to the Stokes Raman scattering light pass filter 11c by the measurement execute program 41 of the signal processing/storing control section 9. The measurement execute program 41 also effects emission of the next light pulse train. Thereby, the measurement, addition/averaging, etc. are performed, and the intensity distribution signal $I_R$ of Rayleigh scattering light is obtained, as in the case of the anti-Stokes Raman scattering light measurement. The intensity distribution signal $I_R$ within the high-speed memory 40 is stored in the intensity distribution storage 43 by the measurement execute program 41.

Thus, each measuring process is completed and intensity distribution signals $I_a$, $I_b$ and $I_R$ are stored in the intensity distribution storage 43. Then, control is shifted from the measurement execute program 41 to the arithmetic processing program 42. Subsequently, the temperature arithmetic processing operation will be executed by the arithmetic processing program 42.

The arithmetic processing program 42 substitutes, in equation (11), the intensity distribution signal $I_a$ of anti-Stokes Raman scattering light, the intensity distribution signal $I_s$ of Stokes Raman scattering light, and the intensity distribution signal $I_R$ of Rayleigh back scattering light, which are measured and stored in the intensity distribution storage 43. Thus, the CPU 34 is made to calculate $R_s(x) \cdot R_a(x)$. By substituting the intensity distribution signals $I_a$, $I_b$ and $I_R$ in equation (11), the ratios of the intensity distribution signals $I_a$ and $I_s$ of Raman scattering light to the intensity distribution signal IR of Rayleigh back scattering light are obtained, respectively. This means that the intensity distribution signals $I_a$ and $I_s$ of Raman scattering light are normalized, with the intensity distribution signal $I_R$ of Rayleigh back scattering light used as reference signal. In equation (11), the product $R_s(x) \cdot R_a(x)$ of the ratio of scattering coefficients is calculated by the product of the normalized intensity distributions of Raman scattering light.

Figure 8:
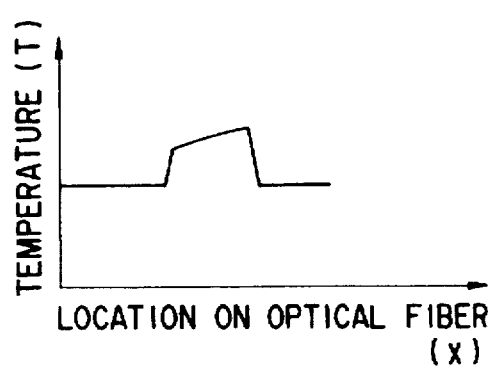
FIG. 8 is an example of a temperature distribution measured in the case where the position of an optical fiber is used as parameter.

Subsequently, the arithmetic processing program 42 enables the CPU 34 to calculate the temperature distribution on the optical fiber 3 on the basis of the calculated product $R_s(x) \cdot R_a(x)$ of the ratio of scattering coefficients and the conversion table 44. The CPU 34 outputs the calculated temperature distribution measurement result e and stores it in the secondary memory 38. FIG. 8 shows an example of the temperature distribution measurement result e. Thus, the temperature of the object 1 is measured along the optical fiber 3.

As has been described above, according to the light-temperature distribution sensor and temperature distribution measuring method of this embodiment, the scattering light pass filters 11a, 11b and 11c of the optical filter 11 are switched, thereby obtaining the intensity distribution signal $I_a$ of anti-Stokes Raman scattering light, the intensity distribution signal $I_s$ of Stokes Raman scattering light, and the intensity distribution signal $I_R$ of Rayleigh back scattering light. Furthermore, the ratio of the intensity distribution signals $I_a$ and $I_s$ of Raman scattering light is found with the intensity distribution signal $I_R$ of Rayleigh back scattering light used as reference signal. Based on the normalized intensity distribution of each Raman scattering light component, the temperature distribution on the optical fiber 3 is calculated. Accordingly, information on the variation in attenuation factor of optical fiber 3 with the passing of time can be eliminated from the temperature distribution.

If the intensity distribution of each Raman scattering light, which has been normalized by the intensity distribution signal $I_R$ of Rayleigh back scattering light, is used for calculating the temperature distribution, the information on the variation with the passing of time can be eliminated from the temperature distribution in the present invention because the effect itself of the attenuation factor of the optical fiber is removed from equation (11).

Accordingly, in this temperature distribution sensor, it is possible to prevent the degradation in precision of temperature distribution measurement due to a variation in characteristics of the attenuation factor of the optical fiber 3.

Furthermore, in this temperature distribution sensor, adequate measurement precision can be maintained, irrespective of a variation in attenuation factor a of the optical fiber with the passing of time due to heat hysteresis, microbend loss, bending loss, etc. of the metallic pipe of the optical fiber 3.

(Second Embodiment)

Figure 9:
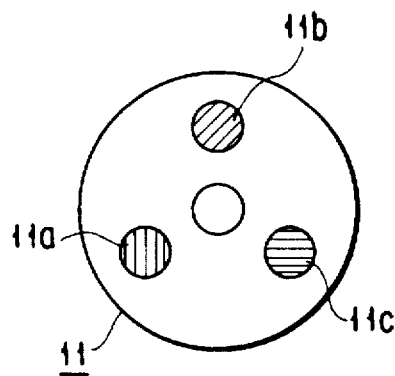
FIG. 9 is a front view showing the structure of optical filters in an optical filter unit of a light-temperature distribution sensor according to a second embodiment of the invention.

FIG. 9 is a front view of the structures of optical filters of an optical filter unit in a light-temperature distribution sensor according to a second embodiment of the invention.

The second embodiment has the same structure as the first embodiment except for the structures of the optical filters 11 of the optical filter unit 6.

In FIG. 9, the optical filter 11 has a disk-like shape. The optical filter 11 is constructed such that the rotary shaft of the pulse motor 12 can be attached to the center axis of the filter 11.

Three circular openings are formed concentrically with the central axis. Three circular filters 11a, 11b and 11c are provided in the respective openings. These three filters are: an anti-Stokes Raman scattering light pass filter 11a which passes only anti-Stokes wavelength light, a Stokes Raman scattering light pass filter 11b which passes only Stokes wavelength light, and a Rayleigh scattering light pass filter 11c which passes only Rayleigh wavelength light.

With the light-temperature distribution sensor having the above structure, temperature measurement is performed and a temperature distribution is calculated in the same manner as in the first embodiment.

According to the above-described light-temperature distribution sensor, the pass filters 11a, 11b and 11c are provided in the three openings formed concentrically with the central axis of the optical filter. Thus, the areas of the pass filters 11a, 11b and 11c can be reduced and these pass filters can be easily handled.

(Third Embodiment)

Figure 10:
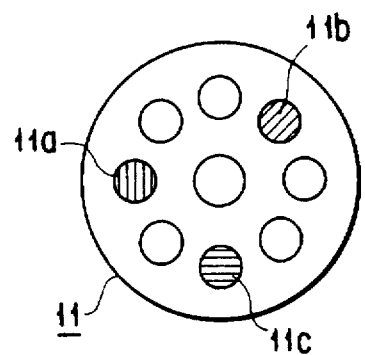
FIG. 10 is a front view showing the structure of optical filters in an optical filter unit of a light-temperature distribution sensor according to a third embodiment of the invention.

FIG. 10 is a front view of the structures of optical filters of an optical filter unit in a light-temperature distribution sensor according to a third embodiment of the invention.

The third embodiment has the same structure as the first embodiment except for the structures of the optical filters 11 of the optical filter unit 6.

In FIG. 10, the optical filter 11 has a disk-like shape. The optical filter 11 is constructed such that the rotary shaft of the pulse motor 12 can be attached to the center axis of the filter 11.

Three or more circular openings (eight in FIG. 10) are formed concentrically with the central axis. Three circular filters 11a, 11b and 11c are provided in three of the openings. These three filters are: an anti-Stokes Raman scattering light pass filter 11a which passes only anti-Stokes wavelength light, a Stokes Raman scattering light pass filter 11b which passes only Stokes wavelength light, and a Rayleigh scattering light pass filter 11c which passes only Rayleigh wavelength light.

With the light-temperature distribution sensor having the above structure, temperature measurement is performed and a temperature distribution is calculated in the same manner as in the first embodiment. According to the above-described light-temperature distribution sensor, the pass filters 11a, 11b and 11c are provided in the three of the openings formed concentrically with the central axis of the optical filter. Thus, the areas of the pass filters 11a, 11b and 11c can be reduced and these pass filters can be easily handled.

A standardized jig is commercially available for attaching the filter as shown in FIG. 10, and can be used as it is. Thus, the apparatus can be manufactured inexpensively and easily.

(Fourth Embodiment)

Figure 11:
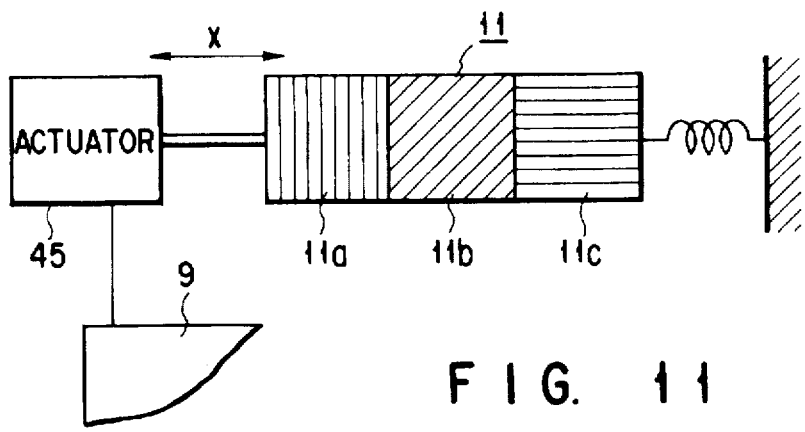
FIG. 11 shows the structure of a main part of an optical filter unit in a light-temperature distribution sensor according to a fourth embodiment of the invention.

FIG. 11 is a view showing a main part of an optical filter unit in a light-temperature distribution sensor according to a fourth embodiment of the invention.

The fourth embodiment has the same structure as the first embodiment except for the structures of the optical filter unit 6.

The optical filter unit 6 comprises an optical filter 11 and an actuator 45 with an operating portion connected to one end of the optical filter 11.

The actuator 45 moves the optical filter 11 in a direction of arrow x in FIG. 11 under control by the control section 31 in the signal processing/storing control section 9.

The optical filter 11 comprises, in the order represented by the direction of arrow x, three pass filters: an anti-Stokes Raman scattering light pass filter 11a which passes only anti-Stokes wavelength light, a Stokes Raman scattering light pass filter 11b which passes only Stokes wavelength light, and a Rayleigh scattering light pass filter 11c which passes only Rayleigh wavelength light.

The optical filter 11 is interposed between lenses 10b and 10c. Optical fibers are connected to those ends of the lenses 10b and 10c, which are opposed to the mutually facing ends of the lenses 10b and 10c, in the same fashion as shown in FIG. 3.

The operation of the light-temperature distribution sensor with the above structure is the same as that of the sensor of the first embodiment, except that the pass filters 11a, 11b and 11c are switched by the x-directional movement of the actuator 45, and the fourth embodiment has the same advantage as the first embodiment.

(Fifth Embodiment)

FIG. 12 is a block diagram showing the structure of a light-temperature distribution sensor body according to a fifth embodiment of the invention. The structural elements common to those in FIGS. 1, 2, 3 and 4 are denoted by like reference numerals and a description thereof is omitted.

In this light-temperature distribution sensor, the back scattering light b is guided to the optical fiber 3b via the coupler 5 and then divided into three back scattering light components b1, b2 and b3 via a star coupler 46. The divided back scattering light components b1, b2 and b3 are guided to optical fibers 3c1, 3c2 and 3c3.

The back scattering light component b1 is made incident on an anti-Stokes Raman scattering light pass filter 11a which passes only anti-Stokes wavelength light. Consequently, a specific wavelength light component c1 containing anti-Stokes wavelength light alone is obtained.

The specific wavelength light component c1 is converted to an electric signal via an associated photodetector 7. Then, as in the first embodiment, the electric signal is converted to a digital signal d1 in an associated A/D converter 8 and input to the arithmetic processing section 32.

Similarly, back scattering light components b2 and b3 are passed through a Stokes Raman scattering light pass filter 11b which passes only Stokes wavelength light and a Rayleigh scattering light pass filter 11c which passes only Rayleigh wavelength light. Consequently, specific wavelength light components c2 and c3 are obtained. The specific wavelength light components c2 and c3 are converted to digital signals d2 and d3 and input to the arithmetic processing section 32.

Although not shown, the arithmetic processing section 35 includes three measurement data receivers 35, the structure of each of which is shown in FIG. 5, in order to process in parallel the digital signals d1, d2 and d3, respectively.

The operation of the light-temperature distribution sensor with the above structure is the same as that of the sensor of the first embodiment. In addition, in the fifth embodiment, the back scattering light b is divided into three components by the star coupler 46.

Accordingly, in the subsequent processing, the specific wavelength light component c1 containing anti-Stokes wavelength light alone, the specific wavelength light component c2 containing Stokes wavelength light alone, and the specific wavelength light component c3 containing Rayleigh wavelength light alone, are extracted at the same time and the respective intensity distribution signals $I_a$, $I_s$ and $I_R$ are obtained at the same time.

Thus, the intensity distribution signals $I_a$, $I_s$ and $I_R$, which are necessary for temperature distribution measurement, are obtained at the same time by the light pulse train, and the temperature distribution can be calculated efficiently. In order to enhance the measurement precision, the number of pulses of the light pulse train may be made greater than 100,000, e.g. 200,000 or 1,000,000.

According to the above-described light-temperature distribution sensor, the back scattering light b is divided into three components and the intensity distribution signals $I_a$, $I_s$ and $I_R$ are obtained simultaneously from the divided three components. Therefore, the temperature distribution can be measured efficiently.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A light-temperature distribution sensor comprising:
a light transmission medium;
a light source portion providing a light pulse incident on said light transmission medium for travel through said light transmission medium;
a scattering light extraction portion extracting Rayleigh scattering light, anti-Stokes Raman scattering light and Stokes Raman scattering light from back scattering light produced by the light pulse in said light transmission medium and providing corresponding intensity distribution signals; and
a normalizing arithmetic processing portion normalizing the intensity distribution signals corresponding to the anti-Stokes Raman scattering light and the Stokes Raman scattering light using the intensity distribution signal corresponding to the Rayleigh scattering light as a normalizing reference signal to obtain normalized anti-Stokes Raman and normalized Stokes Raman intensity distribution signals, and calculating a temperature distribution on the light transmission medium using the normalized anti-Stokes Raman and normalized Stokes Raman intensity distribution signals corresponding to the anti-Stokes Raman scattering light and the Stokes Raman scattering light, respectively.

2. The light-temperature distribution sensor according to claim 1, wherein said normalizing arithmetic processing portion calculates said normalized intensity distribution signals corresponding to the anti-Stokes Raman scattering light and the Stokes Raman scattering light using an equation:

$$R_s(x) \cdot R_a(x) = (I_a/I_R) \cdot (I_s/I_R)$$

where $R_a(x)$ is a ratio of scattering coefficients at position x, $R_s(x)$ is a ratio of scattering coefficients at position x, $k_a(x)$ is an anti-Stokes scattering coefficient at position x, $k_s(x)$ is a Stokes scattering coefficient at position x, $k_R(x)$ is a Rayleigh scattering coefficient at position x, $I_a$ is an anti-Stokes back scattering light intensity at position x, $I_s$ is a Stokes back scattering light intensity at position x, and $I_R$ is a Rayleigh back scattering light intensity at position x.

3. The light-temperature distribution sensor according to claim 1, wherein said light transmission medium comprises an optical fiber.

4. The light-temperature distribution sensor according to claim 3, wherein said light source portion causes single wavelength light to be incident on said light transmission medium for travel through said light transmission medium.

5. The light-temperature distribution sensor according to claim 3, wherein said light source includes a laser.

6. The light-temperature distribution sensor according to claim 5, wherein said scattering light extraction portion further comprises:
an optical filter portion having a controller and selectively passing one of said anti-Stokes Raman scattering light, the Stokes Raman scattering light and the Rayleigh scattering light as determined by said controller;
a photodetector receiving and then converting the scattering light passed through said optical filter portion into corresponding electric signals; and
an A/D converter receiving and then converting said corresponding electric signals into digital signals corresponding to one of said intensity distribution signals.

7. The light-temperature distribution sensor according to claim 6, wherein said optical filter portion further comprises:
a filter segment drive including a filter segment drive control: and an array of optical light pass filter segments including an anti-Stokes Raman scattering light pas filter segment passing only anti-Stokes wavelength light, a Stokes Raman scattering light pass filter segment passing only Stokes wavelength light, and a Rayleigh scattering light pass filter segment passing only Rayleigh wavelength light, wherein each one of the optical light pass filter segments is selectively positioned at an optical axis in a path of said back scattering light by said filter segment drive under control by the filter segment drive control.

8. A light-temperature distribution sensor comprising:
a light transmission medium;
a light source providing a light pulse incident on said light transmission medium for travel through said light transmission medium;
a scattering light extraction portion extracting Rayleigh scattering light, anti-Stokes Raman scattering light and Stokes Raman scattering light from back scattering light produced by the light pulse in said light transmission medium and providing corresponding intensity distribution signals; and a normalizing arithmetic processing portion normalizing the intensity distribution signals corresponding to the anti-Stokes Raman scattering light and the Stokes Raman scattering light using the intensity distribution signal corresponding to the Rayleigh scattering light as a normalizing reference signal, and calculating the temperature distribution on the light transmission medium using a product of the normalized intensity distribution signals corresponding to the anti-Stokes Raman scattering light and the Stokes Raman scattering light.

9. The light-temperature distribution sensor according to claim 8, wherein said light transmission medium comprises an optical fiber and said light source includes a laser.

10. The light-temperature distribution sensor according to claim 9, wherein said normalizing arithmetic processing portion calculates the temperature distribution on the optical fiber further using conversion data corresponding to a product of said normalized intensity distribution signals.

11. The light-temperature distribution sensor according to claim 10, wherein said normalizing arithmetic processing portion receives calibration data relative to an object which has a known temperature as said conversion data.

12. The light-temperature distribution sensor according to claim 10, wherein said scattering light extraction portion further comprises:

an optical filter portion having a controller and selectively passing one of said anti-Stokes Raman scattering light, the Stokes Raman scattering light and the Rayleigh scattering light as determined by said controller;

a photodetector receiving and then converting light passed through said optical filter portion into corresponding electric signals; and an A/D converter receiving and then converting said corresponding electric signals into digital signals corresponding to one of said intensity distribution signals.

13. The light-temperature distribution sensor according to claim 10, wherein said scattering light extraction portion comprises a star coupler having a first signal extraction segment a second signal extraction segment and a third signal extraction segment, said star coupler dividing the back scattering light into three back scattering light components and guiding the back scattering light components to said first, second, and third signal extraction segments, respectively, said first signal extraction segment comprising a first filter passing only anti-Stokes Raman scattering light, a first photodetector receiving ant converting the anti-Stokes Raman scattering light passed by the first filter to a first electric signal, and a first A/D converter receiving and then converting said first electric signal to a first digital signal, said second signal extraction segment comprising a second filter receiving and then passing only Stokes Raman scattering light, a second photodetector converting the Stokes Raman scattering light passed by the second filter to a second electric signal, and a second A/D converter receiving and then converting said second electric signal to a second digital signal, and said third signal extraction segment comprising a third filter passing only Rayleigh scattering light, a photodetector receiving and then converting the Rayleigh scattering light passed by the third filter to a third electric signal, and a third A/D converter receiving and then converting said third electric signal to a third digital signal.

14. The light-temperature distribution sensor according to claim 12, wherein said optical filter portion further comprises:

a filter segment drive including a filter segment drive control; and an array of optical light pass filter segments including an anti-Stokes Raman scattering light pass filter segment passing only anti-Stokes wavelength light, a Stokes Raman scattering light pass filter segment passing only Stokes wavelength light, and a Rayleigh scattering light pass filter segment passing only Rayleigh wavelength light, wherein each one of the optical light pass filter segments is selectively positioned at an optical axis of said back scattering light by said filter segment drive under control by the filter segment drive control.

15. The light-temperature distribution sensor according to claim 14, wherein said array of optical light pass filter segments are provided on a disk having at least three openings, said anti-Stokes Raman scattering light pass filter segment, said Stokes Raman scattering light pass filter segments and said Rayleigh scattering light pass filter segment are provided in said three openings, respectively, and said filter segment drive is controlled by said filter segment drive control to rotate said disk to perform said selective positioning.

16. The light-temperature distribution sensor according to claim 14, wherein said array of optical light pass filter segments comprises said anti-Stokes Raman scattering light pass filter segment, said Stokes Raman scattering light pass filter segment, and said Rayleigh scattering light pass filter segment in alignment along an axis perpendicular to an optical axis of the back scattering light, and said filter segment drive is controlled by said filter segment drive control to selectively position said scattering light pass segments by moving said array of optical light pass filter segments along the axis perpendicular to the optical axis of the back scattering light.

17. A method of measuring a light-temperature distribution, comprising the steps of:

making a light pulse travel through a light transmission medium which transmits incident light while attenuating the intensity of the incident light;

extracting Rayleigh scattering light, anti-Stokes Raman scattering light and Stokes Raman scattering light as intensity distribution signals from back scattering light produced by the light pulse in said light transmission medium;

normalizing the intensity distribution signals corresponding to the anti-Stokes Raman scattering light and the Stokes Raman scattering light using the intensity distribution signal corresponding to the Rayleigh scattering light as a normalizing reference signal to obtain normalized anti-Stokes Raman and normalized Stokes Raman intensity distribution signals; and calculating a temperature distribution on the light transmission medium using the normalized anti-Stokes Raman and normalized Stokes Raman intensity distribution signals corresponding to the anti-Stokes Raman scattering light and the Stokes Raman scattering light, respectively.

18. The method according to claim 17, wherein said normalizing step includes normalizing said normalized intensity distribution signals corresponding to the anti-Stokes Raman scattering light and the Stokes Raman scattering light using an equation:

$$R_s(x) \cdot R_a(x) = (I_a/I_R) \cdot (I_s/I_R)$$

where $R_a(x)$ is a ratio of scattering coefficients at position x, $R_s(x)$ is a ratio of scattering coefficients at position x, $k_a(x)$ is an anti-Stokes scattering coefficient at position x, $k_s(x)$ is a Stokes scattering coefficient at position x, $k_R(x)$ is a Rayleigh scattering coefficient at position x, $I_a$ is an anti-Stokes back scattering light intensity at position x, $I_s$ is a Stokes back scattering light intensity at position x, and $I_R$ is a Rayleigh back scattering light intensity at position x.

19. The method according to claim 18, wherein said normalizing step further includes a step of multiplying the right side of said equation in which said normalized intensity distribution signals of the anti-Stokes Raman scattering light and the Stokes Raman scattering light are substituted by a correction coefficient.

20. The method according to claim 17, wherein said temperature distribution calculating step includes calculating the temperature distribution in accordance with a product of the normalized intensity distribution signals of the anti-Stokes Raman scattering light and the Stokes Raman scattering light, whereby a time variation of a light intensity attenuation factor of said light transmission medium is eliminated.

21. The method according to claim 17, wherein said step of making the light pulse travel through the light transmission medium makes a light pulse having a single wavelength travel through an optical fiber.

22. The method according to claim 17, wherein said step of making the light pulse travel through the light transmission medium includes producing the light pulse by a laser, wherein the medium is an optical fiber.

23. The method according to claim 20, wherein said step of making the light pulse travel through the light transmission medium includes providing the light pulse by a laser, wherein the medium is an optical fiber.

24. The method according to claim 23, wherein said temperature distribution calculating step includes calculating the temperature distribution on the optical fiber using conversion data that is obtained by using an object for temperature measurement which has a known temperature, that corresponds to a value of the product of said normalized intensity distribution signals.

25. The light-temperature distribution sensor according to claim 1, wherein the normalizing arithmetic processing portion calculates the temperature distribution on the light transmission medium to compensate for different attenuation of back scattering light at different wavelengths.

* * * * *